United States Patent [19]
Knight

[11] 3,724,545
[45] Apr. 3, 1973

[54] ECONOMICAL MOBILITY CONTROL IN OIL RECOVERY PROCESSES

[75] Inventor: Bruce L. Knight, Littleton, Colo.

[73] Assignee: Marathon Oil Company, Findlay, Ohio

[22] Filed: Sept. 28, 1970

[21] Appl. No.: 76,140

[52] U.S. Cl.....................................166/273, 166/274
[51] Int. Cl. ..............................................E21b 43/22
[58] Field of Search.......166/274, 273, 268, 292–295

[56] References Cited

UNITED STATES PATENTS

| | | | |
|---|---|---|---|
| 3,523,581 | 8/1970 | Murphy | 166/273 |
| 3,486,559 | 12/1969 | Flickinger et al. | 166/275 X |
| 3,467,187 | 9/1969 | Gogarty et al. | 166/273 |
| 3,208,518 | 9/1965 | Patton | 166/275 X |

Primary Examiner—Stephen J. Novosad
Attorney—Joseph C. Herring, Richard C. Willson, Jr. and Jack L. Hummel

[57] ABSTRACT

Improved mobility control in secondary and tertiary recovery processes is obtained by injecting at least two slugs into the reservoir, one slug designed to effect a permeability reduction and the other slug containing an agent which more effectively increases the fluid viscosity. For example, an aqueous slug containing a partially hydrolyzed, high molecular weight polyacrylamide can be injected (this slug efficiently reduces the relative permeability to the flow of the aqueous slug through the reservoir), followed by an aqueous slug containing a biopolymer, e.g., a linear polysaccharide having a molecular weight of about one million (this agent more effectively increases the viscosity of the water and has a lesser effect on permeability reduction). This combination of slugs gives more efficient and economical mobility control in flooding subterranean oil-bearing formations to recover oil therefrom.

13 Claims, 1 Drawing Figure

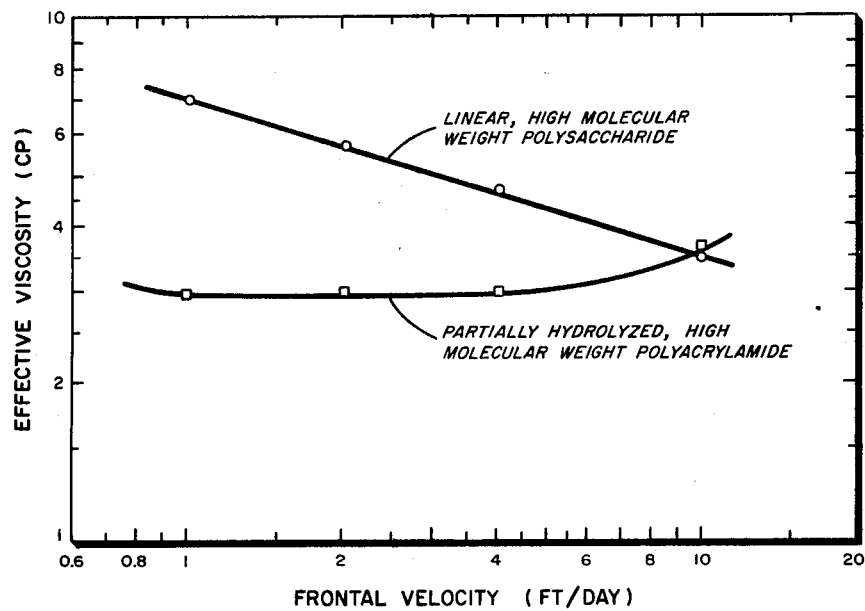

ECONOMICAL MOBILITY CONTROL IN OIL RECOVERY PROCESSES

BACKGROUND OF THE INVENTION

1. Field of the Invention

Fluids are injected through an injection well in fluid communication with an oil-bearing subterranean formation and displaced toward a production well to recover crude oil therefrom. More specifically, the process relates to improved mobility control of a secondary or tertiary recovery method. At least two slugs of fluid are injected into the reservoir, one slug effecting a reduction in the relative permeability to the flow of that slug through the formation and the other slug containing a viscosity increasing agent in amounts sufficient to increase the viscosity of that particular slug flowing through the reservoir. Improved oil recoveries are obtained by this mobility control concept.

Description of the Prior Art

Waterflooding with mobility-reducing agents (e.g., with high molecular weight polyacrylamides or polysaccharides) has been successfully used to recover increased amounts of oil in secondary recovery methods. Also, the use of a mobility buffer slug behind a miscible-type displacing agent has been successful in obtaining better mobility control and, as a result, increased oil recoveries. Examples of the latter are taught in U. S. Pat. Nos. 3,254,714 to Gogarty et al.; 3,497,006 to Jones et al.; 3,506,070 and 3,506,071 to Jones.

A design criterion for an optimum tertiary flooding process is to have the mobility of the displacing fluid about equal to or less than that of the combination of formation fluids (hydrocarbon and interstitial water) within the reservoir. After this displacing slug, there is followed a mobility buffer which desirably has a mobility of at least about that or less than that of the rear end of the displacing slug. The rear end of the mobility buffer can have a mobility about equal to that of the final drive fluid, e.g., drive water. This design criterion is especially useful when flooding with a micellar dispersion followed by a mobility buffer followed by drive water. Examples of this design concept are taught in U. S. Pat. Nos. 3,406,754 to Gogarty; 3,412,791 to Gogarty; 3,443,635 to Gogarty et al.; 3,443,636 to Gogarty; 3,467,187 to Gogarty et al. The volume amount of injected mobility buffer is generally around 40–60 percent formation pore volume and is usually expensive due to the high cost of partially hydrolyzed, high molecular weight polyacrylamides, the most currently used mobility-reducing agent.

Mobility control in a flooding process can be obtained in numerous ways. One is to reduce the relative permeability to the flow of a particular fluid flowing through the formation. Another way is to increase the viscosity of the flowing fluid, thus reducing the mobility thereof. Also, the characteristics of the subterranean formation, e.g., the sensitivity of clay minerals to water, can be used to reduce the relative permeability, etc.

The most common practice of improving waterflooding operations is to inject into the waterflood a single agent to effect a reduction in mobility. Generally, this agent is a partially hydrolyzed, high molecular weight polyacrylamide.

SUMMARY OF THE INVENTION

Applicant has discovered a novel method of improving mobility control of a flooding process by injecting at least two separate slugs, one slug containing sufficient amounts of an agent that is especially efficient in reducing the relative permeability of the rock to the fluid flowing in the formation; the other slug containing a viscosity-increasing agent (this agent being very effective to increase viscosity, and preferably salt insensitive) in amounts sufficient to substantially increase the viscosity of the slug. The combination of these two slugs is an economical and effective method to obtain better mobility control and improved oil recoveries in secondary and tertiary recovery processes.

BRIEF DESCRIPTION OF THE DRAWING

The FIGURE represents the effective viscosity vs. the frontal velocity of Pusher 700 polymer (a partially hydrolyzed, high molecular weight polyacrylamide marketed by Dow Chemical Co., Midland, Mich.) and a biopolymer, a linear high molecular weight (about 1,000,000) polysaccharide. From this figure it is readily ascertainable that at a frontal velocity of one foot per day, the biopolymer has a higher effective viscosity in a core than does the polyacrylamide polymer. However, as the frontal velocity approaches 10 feet/day, the effective viscosity of the polyacrylamide and the biopolymer are about the same. It is common knowledge that in flooding a reservoir, it is desirable to flood at a velocity of about 1 foot/day to obtain efficient displacement of the oil.

DESCRIPTION OF PREFERRED EMBODIMENTS

The agents that are particularly useful to effectively reduce the permeability of the reservoir rock to the flow of an aqueous solution are the partially hydrolyzed polyacrylamides having molecular weights above about 500,000 to about 10,000,000 or more, especially those having about 10 – 70 percent of the carboxyamide groups hydrolyzed to carboxyl groups; examples of such polymers include those found in U. S. Pat. No. 3,039,529 to McKennon and U. S. Pat. No. 2,827,964 to Sandiford et al. Also useful are high molecular weight polymers obtained from monomers such as a modified acrylamide reacted with olefin and derivatives of sulfuric acid to give a sulfonated alkyl derivative of acrylamide. Other useful agents include those found in U. S. Pat. Nos. 2,625,529 to Hedrick et al. and 2,740,522 to Aimore et al. However, any synthetic polymer which effectively reduces the permeability of the formation to the flow of an aqueous material and is compatible in the formation is useful with the invention.

Examples of useful viscosity-increasing agents include biopolymers such as the polysaccharides and derivatives of polysaccharides. A particularly useful one is Kelzan-M, a polysaccharide polymer marketed by the Xanco Division of Kelco Chemical Co., San Diego, Calif. U.S.A. Also useful are water-soluble, linear, high molecular weight monoalkenyl aromatic sulfonate polymers as defined in U. S. Pat. No. 3,067,161 to Roth. Examples of other useful viscosity-increasing agents include those defined in U. S. Pat. Nos. 2,728,725 to Gloor; 3,054,778 to Honea et al.; and 3,000,830 to Fong et al.

Preferably, the permeability-reducing agent is first injected into the reservoir followed by the viscosity-increasing agent. These two slugs can be used alone in a waterflooding process or can be used in combination with miscible or miscible-type flooding processes. For example, a micellar dispersion (either oil or water-external) or a miscible flooding agent or miscible-like flooding agent can be injected followed by a slug containing the permeability-reducing agent and this, in turn, followed by the viscosity-increasing agent, and finally, a drive fluid, such as drive water, can be injected to displace the oil toward a production means. Preferably, about 1–20 percent formation pore volume of a micellar dispersion precedes the slug containing the permeability-reducing agent.

Examples of volume amounts of slugs containing the permeability-reducing agent and the viscosity-increasing agent include from about 5 percent to about 30 percent or more. Also, miniature slugs such as 1–5 percent are useful in special applications. The concentration of the permeability-reducing agent and the viscosity-increasing agent in the slug can be determined by routine laboratory experiments for the particular application. For example, where more complete mobility control is desired, it is necessary that more of the agent be incorporated, whereas if limited mobility control is desired, less of the agent can be incorporated. Examples of useful amounts of the agents in the slugs include from about 50 ppm up to and above about 1,500 ppm. More preferably, about 400–1,000 ppm will give efficient mobility control.

The following examples are presented to teach specific embodiments of the invention. Unless otherwise specified, all percents are based on volume. The permeabilities are determined at a frontal velocity of 1 ft/day.

EXAMPLE 1

To indicate the degree of permeability reduction, a sandstone core one inch in diameter and three inches long is flooded with water (containing about 55 ppm of calcium-containing salts and about 400 ppm of monovalent cation-containing salts). The initial permeability of the core with respect to this water is 167 md at ambient temperature. Thereafter, the same water but containing 700 ppm of Pusher 700 is flooded through the core until a constant final permeability is obtained—this value being 20.6 md at ambient temperature. The ratio of the initial permeability to the final permeability is 8.1 and the effective viscosity of the aqueous Pusher 700 solution flowing through the core is 3.0 cp at 1 ft/day at ambient temperature.

In a core similar to the above core, the same test procedure is used with the same water. The initial permeability to the flow of water is 130 md at ambient temperature. Thereafter, an aqueous solution containing 700 ppm of a linear, high molecular weight polysaccharide is flowed through the sandstone core until a constant permeability is obtained—this permeability is 32 md at ambient temperature. The ratio of the initial permeability to the final permeability is 4.1, but the effective viscosity of the aqueous polysaccharide solution flowing through the core is 7.0 cp at 1 ft/day and ambient temperature. Therefore, the latter has a more effective viscosity than the Pusher 700 but less of an effect on the reduction of permeability.

A reservoir that has been reduced to residual oil saturation is flooded by injecting about 5 percent pore volume of a micellar dispersion. The micellar dispersion is composed of about 70 percent aqueous medium, about 8 percent of an ammonium petroleum sulfonate having an average equivalent weight of about 400, and 22 percent crude oil. The mobility of the front portion of the micellar dispersion flowing in the formation is about equal to that of the combination of crude oil and interstitial water within the formation. After the micellar dispersion, there is injected 20 percent pore volume of an aqueous solution containing 700 ppm of Pusher 700. Thereafter, there is injected 20 percent pore volume of an aqueous solution containing 700 ppm of a linear, high molecular weight polysaccharide. The back portion of the aqueous solution containing the polysaccharide is graded to a high mobility about equal to that of water. Then, a drive water is injected to displace the micellar dispersion toward a production well in fluid communication with the reservoir. Economically attractive portions of oil are recovered at the production well.

EXAMPLE 2

A one inch by three inch sandstone core is flooded with water (containing about 55 ppm of calcium-containing salts and about 400 ppm of monovalent cation-containing salts); the initial permeability with respect to this water is 100 md at ambient temperature. Thereafter, the core is flooded with the same water but containing 700 ppm of Pusher 700 polymer; the stabilized permeability to the flow of this fluid is 12.4 md at ambient temperature. The ratio of initial permeability to the final permeability is 8.1. The effective viscosity of the aqueous solution containing the Pusher 700 polymer is 3.0 cp at ambient temperature at 1 ft/day. The effective mobility of this solution flowing through the core is:

$$\lambda \text{ eff} = (v/\mu) \text{ eff} = 100/8.1/3.0 = 4.12 \text{ md/cp}.$$

Another sandstone core having the same dimensions is flooded with the same water and the initial permeability is 100 md at ambient temperature. Thereafter, the core is flooded with the same water, except it contains 700 ppm of a linear polysaccharide having a molecular weight of about 1,000,000; the stabilized permeability with respect to this liquid is 23.3 md at ambient temperature. The ratio of initial permeability to final permeability is 4.3. The effective viscosity of this aqueous polysaccharide solution is 7.0 cp at 1 ft/day. The effective mobility of this liquid flowing through the core is:

$$\lambda \text{ eff} = (\kappa/\mu) \text{ eff} = 100/4.3/7.0 = 3.32 \text{ md/cp}.$$

A core is first saturated with water, then flooded with crude oil and thereafter flooded with water to residual oil saturation. Thereafter, the core is flooded with 5 percent pore volume of a micellar solution followed by 40 percent pore volume of the above aqueous polyacrylamide solution; the effective mobility analyzed in a 100 md core is 4.12 md/cp.

An identical core containing about the same residual oil saturation is flooded with 5 percent pore volume of the same micellar solution followed by 20 percent pore volume of the aboveidentified aqueous polyacrylamide solution; this followed by 20 percent pore volume of the above aqueous polysaccharide solution. In this case, the advantage of the greater permeability-reduction capability of the aqueous polyacrylamide solution (8.1) coupled with the greater effective viscosity of the polysaccharide solution (7.0 cp at 1 ft/day) is utilized. The polysaccharide solution flows through the core of effective permeability:

$$\kappa\,\text{eff} = 100/8.1 = 12.3\,\text{md}$$

But the effective viscosity of the polysaccharide solution is 7.0 cp; hence the effective mobility of the second bank of polymer solution is $$\lambda\,\text{eff} = (\kappa/\mu)\,\text{eff} = 100/8.1/7.0 = 1.76\,\text{md/cp}.$$

The improved mobility factor with the Pusher 700/polysaccharide flood is equal to 4.12 1.76 or 2.34 times greater than the flood where the 40 percent aqueous polyacrylamide solution is used, based on the data in the 100 md cores. Improved oil recoveries are obtained by using a combination of a permeability-reducing slug and a viscosity-increasing slug.

EXAMPLE 3

A core one inch in diameter by three inches long has an initial permeability to the flow of the water identified in Example 2 of 140 md at ambient temperature. Thereafter, the core is flooded with an aqueous solution containing the same water but 700 ppm of Kelzan-M. The final permeability to this biopolymer solution is 28 md at ambient temperature. Thus, the ratio of the initial permeability to the final permeability is 140 + 28 or 5.0. The effective viscosity of the biopolymer solution flowing through the core sample is 4.0 cp at 1 ft/day and ambient temperature.

The oil recovery experiment of Example 2 is repeated except the 20 percent aqueous solution of linear polysaccharide is deleted and this aqueous Kelzan-M biopolymer solution is substituted. An improved mobility factor of 1.33 is obtained as compared to the 40 percent pore volume of the aqueous polyacrylamide solution flood; thus improved mobility control is obtained with the two slugs and more oil is recovered from the core.

It is not intended that this invention be limited by the specifics taught herein. Rather, all equivalents obvious to those skilled in the art are intended to be equated within the scope of the invention as defined within the specification and appended claims.

What is claimed is:

1. A process of obtaining improved mobility control in an oil recovery process wherein a displacing fluid is injected into an oil-bearing subterranean formation via an injection means and displaced toward a production means to recover crude oil therethrough, the improved process comprising injecting a combination of at least two slugs and displacing these slugs toward the production means to recover crude oil therethrough, the first injected slug containing a permeability reducing agent in sufficient amount to effect a permeability reduction of the reservoir rock and the second injected slug containing sufficient amounts of a viscosity-increasing agent to obtain more favorable mobility control to recover crude oil, the permeability reducing agent and the viscosity-increasing agent being different in composition and the slug containing the viscosity-increasing agent being substantially void of a sacrificial agent.

2. The process of claim 1 wherein the permeability-reducing agent is a partially hydrolyzed, high molecular weight polyacrylamide.

3. The process of claim 1 wherein the permeability-reducing agent is a high molecular weight polymer obtained from polymerizing a sulfonated alkyl derivative of acrylamide.

4. The process of claim 1 wherein the viscosity-increasing agent is a high molecular weight biopolymer.

5. The process of claim 1 wherein a miscible slug or a miscible-like slug precedes the combination of the two slugs.

6. The process of claim 1 wherein a micellar dispersion precedes the combination of the two slugs.

7. The process of claim 1 wherein the concentration of the permeability-reducing agent and the viscosity-increasing agent within the slugs is within the range of about 100 to about 3,000 ppm.

8. An improved process for obtaining mobility control in an oil recovery process wherein a displacing fluid is injected through an injection means into a subterranean formation and displaced toward a production means to recover crude oil there-through, the improved process comprising:
  1. injecting about 5 to about 30 percent formation pore volume of an aqueous solution containing a partially hydrolyzed, high molecular weight polyacrylamide, and then
  2. injecting about 5 to about 30 percent formation pore volume of an aqueous solution containing a high molecular weight biopolymer, and
  3. displacing slugs "(1)" and "(2)" toward the production means to recover crude oil therethrough.

9. The process of claim 8 wherein a micellar dispersion is injected into the formation before injection of the aqueous polyacrylamide solution.

10. The process of claim 8 wherein a drive water is injected behind the aqueous biopolymer solution to displace the slugs toward the production means.

11. A process of obtaining improved mobility control in recovering oil from an oil-bearing subterranean formation wherein a micellar dispersion is injected into the formation through an injection means and displaced toward a production means in fluid communication with the formation, the improved process comprising injecting behind the micellar dispersion:
  1. about 5 to about 30 percent formation pore volume of an aqueous solution containing about 100 to about 3,000 ppm of a partially hydrolyzed, high molecular weight polyacrylamide, followed by
  2. about 5 to about 30 percent formation pore volume of an aqueous solution containing about 100 to about 3,000 ppm of a biopolymer, and then injecting
  3. sufficient water to displace the slugs toward the production means to recover crude oil therethrough.

12. The process of claim 11 wherein the biopolymer is a linear polysaccharide.

13. The process of claim 11 wherein about 1 to about 20 percent formation pore volume of the micellar dispersion is injected into the formation.

* * * * *